UNITED STATES PATENT OFFICE.

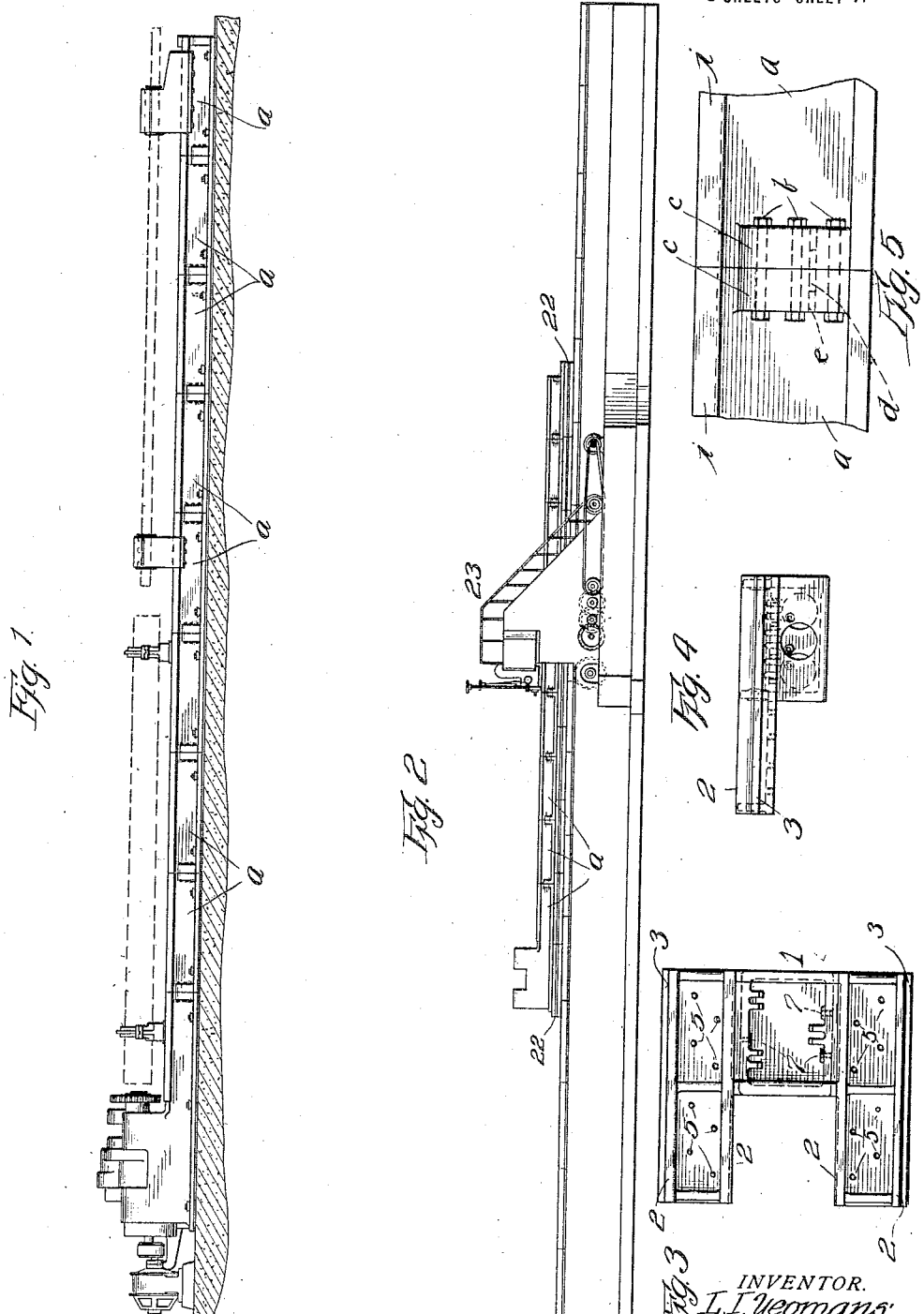

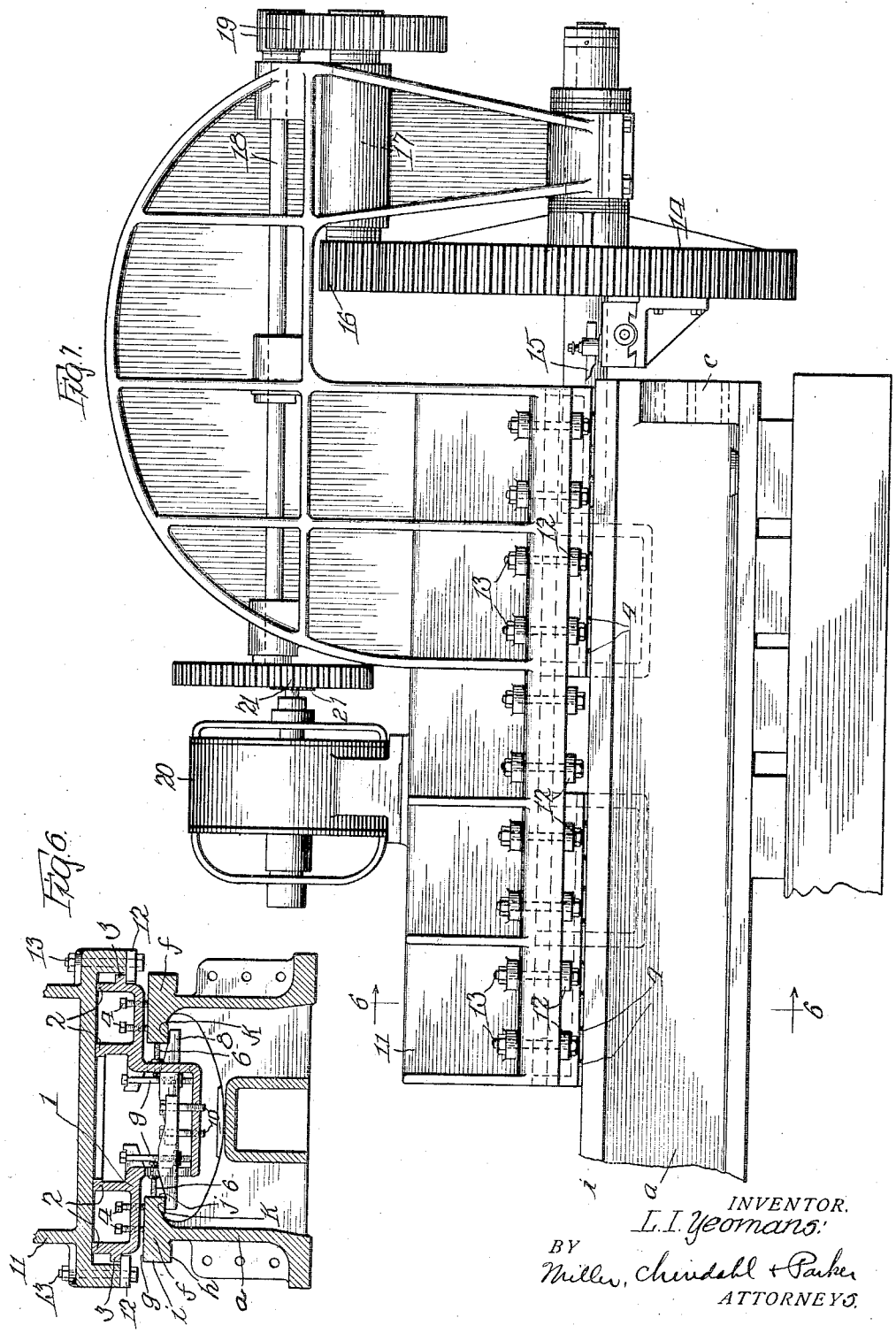

LUCIEN I. YEOMANS, OF CHICAGO, ILLINOIS, ASSIGNOR TO AMALGAMATED MACHINERY CORPORATION, OF CHICAGO, ILLINOIS, A CORPORATION OF DELAWARE.

METHOD OF MANUFACTURING LONG SECTIONAL MACHINE-BEDS.

1,309,386.  Specification of Letters Patent.  Patented July 8, 1919.

Application filed May 23, 1918. Serial No. 236,122.

*To all whom it may concern:*

Be it known that I, LUCIEN I. YEOMANS, a citizen of the United States, residing at Chicago, in the county of Cook and State of Illinois, have invented certain new and useful Improvements in Methods of Manufacturing Long Sectional Machine-Beds, of which the following is a specification.

In constructing a large lathe, gun-boring machine and other long machine tool, the cast-metal bed of the machine is necessarily formed in sections arranged end to end and rigidly secured together. Heretofore the practice has been to place each bed-section upon a planer and plane the ways on which the carriage, bar-guide, steady rest and the like are to be mounted. The bed-section was then taken off the planer and its ends faced off. The sections of the bed were then secured together end to end. It would then be found that the way-sections of the different bed-sections were not perfectly alined horizontally or vertically, and it was hence necessary to disconnect the bed-sections and scrape the ends of the bed-sections until the carriage-ways of the several bed sections were finally brought into alinement. This method necessitated a great deal of skilled hand labor together with repeated connecting and disconnecting of the bed-sections in determining where and how much scraping should be done.

The object of this invention is to provide a method of manufacturing long sectional machine beds having carriage ways thereon whereby the necessity for such laborious and time-consuming fitting operations shall be obviated.

In the accompanying drawings, Figure 1 is a side elevation of a gun-boring machine constructed in accordance with the method herein disclosed. Fig. 2 is a side elevation of a planer showing the boring machine bed mounted upon the platen of a planer. Fig. 3 is a top plan view of a sub-base employed in connection with the end-facing fixture. Fig. 4 is a side elevation of said sub-base. Fig. 5 is a detail view of one of the joints in the boring machine bed. Fig. 6 is a fragmental sectional view taken in the plane of dotted line 6—6 of Fig. 7. Fig. 7 is a side elevation showing the end-facing fixture mounted upon a bed-section.

While the invention is applicable to the manufacture of machines of various types, it is herein shown as employed in connection with the production of a gun-boring machine, the length of which may be assumed to be about eighty feet. The bed of the machine comprises a suitable number of sections $a$, nine being herein shown. These sections are rigidly secured together by suitable means, as, for example, a plurality of bolts $b$ extending through flanges $c$ on the abutting ends of the sections $a$. $d$ is a dowel pin driven into a hole $e$ drilled in the flanges $c$ for the purpose of accurately locating the sections $a$ with reference to each other.

Each section $a$ of the bed comprises ways $f$, the upper surfaces $g$, the lower surfaces $h$ and the vertical surfaces $i$ and $j$ of which are to be planed.

Referring now to Figs. 3, 4 and 6: 1 is a sub-base, having on its upper side ribs 2 on which an end-facing fixture may be supported, and having at its sides longitudinal flanges 3 for engagement by clamping devices on the end-facing fixture. The sub-base is supported upon the rough, unplaned ways $f$ of a bed-section by means of vertical adjusting screws 4 which extend through openings 5 in the sub-base and bear against the upper surfaces $g$ of the ways $f$. The sub-base is adjusted with reference to a vertical plane by means of adjusting screws 6 which extend through horizontal openings 7 in the sub-base and bear against the surfaces $j$ of the ways $f$. By means of the adjusting screws 4 and 6 the sub-base may be properly located upon the bed-section. Suitable means may be provided for securing the sub-base to the bed section as, for example, clamping members 8 carried by screws 9, said clamping members bearing against the surfaces $h$ of the ways and being tightly clamped against said surfaces by means of the screws 10.

In practice, the bed-sections of the various machines being manufactured vary in length, and for this reason the end-facing fixture is preferably supported upon two sub-bases 1. When necessitated by the length of the bed-sections, two sub-bases 1 are located upon each end of the bed-section and the four sub-bases are accurately adjusted into alinement with each other by means of the screws 4 and 6. In the case of a shorter bed section, three sub-bases may suffice. In either case, the required number of sub-bases are mounted upon the bed-section $a$, the ends of which are to be faced, and all of said sub-bases are accurately alined with reference to each other, before the operation of facing the ends of the bed-section is begun.

The means for facing the ends of the bed-sections may be of any suitable character. Herein is shown a frame 11 adapted to rest upon the surfaces 2 of the sub-bases and arranged to be rigidly secured to the sub-bases by suitable means such as clamping plates 12 which are held against the lower surfaces of the flanges 3 by means of clamping bolts 13. In the frame 11 is rotatably mounted a spur gear wheel 14 carrying one or more planer tools 15, said wheel being in mesh with a pinion 16 on a shaft 17. The shaft 17 is driven from a shaft 18 by means of gears 19. The shaft 18 is driven from a motor 20 by means of gears 21. In the operation of the end-facing machine, the tool or tools 15 face the adjacent end of the bed-section $a$. The machine is then unclamped, transferred to the opposite end of the bed-section $a$ and there clamped in place. In this manner, the opposite ends of the bed-sections $a$ are faced so as to be exactly parallel with each other.

After the ends of all the bed-sections have been thus faced, they are mounted upon the platen 22 of a planer 23 which is large enough to receive the entire bed of the gun-boring machine or other machine tool being constructed. The bolts $b$ are then inserted through the flanges $c$ to secure all of the bed-sections rigidly together. Holes $e$ are then drilled through the flanges $c$ and dowel pins $d$ are driven into said holes. The planer 23 is then set in operation to plane the surfaces $g$, $h$, $i$ and $j$ of the ways $f$, all of said surfaces being machined as though the bed of the gun-boring machine were of one piece. After said surfaces have been planed, the dowel pins $d$ and the bolts $b$ are removed, the bed sections $a$ transferred from the planer to the erecting floor, and the work of manufacturing the gun-boring machine is continued.

By reason of the fact that the ends of the bed-sections $a$ are faced before the ways $f$ are planed, and by reason of the further fact that the ways $f$ are planed after the bed sections have been rigidly secured together in the relation which they are finally to occupy, all of the difficulties involved in alining ways which have been separately planed are obviated. Inasmuch as the ways are planed after the bed sections $a$ have been assembled, the ways of the different sections are necessarily perfectly alined.

I claim as my invention:

1. The method of manufacturing the long sectional bed of a machine tool provided with a carriage way, which consists in facing the ends of the bed-sections, then securing the sections together with the faced ends abutting each other in the relation which they are finally to occupy, and then planing said sections to form the way thereon.

2. The method of manufacturing the long sectional bed of a machine tool which includes the step of mounting sub-bases upon the end-portions of a given bed-section in accurate alinement with each other, securing the sub-bases to the bed-section in such alinement, and employing said sub-bases to support a device for facing the ends of the bed-section.

In testimony whereof, I have hereunto set my hand.

LUCIEN I. YEOMANS.